United States Patent
Lim et al.

(10) Patent No.: US 10,999,553 B2
(45) Date of Patent: May 4, 2021

(54) METHOD AND DEVICE FOR GENERATING CONTENT

(71) Applicant: HANMI HEALTHCARE, INC., Pyeongtaek-si (KR)

(72) Inventors: Jong Hoon Lim, Seoul (KR); Yoon su Ham, Seoul (KR)

(73) Assignee: HANMI HEALTHCARE, INC., Pyeongtaek-si (KR)

( * ) Notice: Subject to any disclaimer, the term of this patent is extended or adjusted under 35 U.S.C. 154(b) by 0 days.

(21) Appl. No.: 15/951,206

(22) Filed: Apr. 12, 2018

(65) Prior Publication Data
US 2018/0302588 A1    Oct. 18, 2018

Related U.S. Application Data

(63) Continuation of application No. PCT/KR2015/010982, filed on Oct. 16, 2015.

(51) Int. Cl.
| | | |
|---|---|---|
| G11B 27/10 | (2006.01) |
| H04N 5/91 | (2006.01) |
| G10L 13/06 | (2013.01) |
| G06F 3/0483 | (2013.01) |
| G06F 3/0484 | (2013.01) |
| G06F 3/0488 | (2013.01) |

(52) U.S. Cl.
CPC ............. *H04N 5/91* (2013.01); *G06F 3/0483* (2013.01); *G06F 3/0488* (2013.01); *G06F 3/04845* (2013.01); *G10L 13/06* (2013.01); *G11B 27/10* (2013.01)

(58) Field of Classification Search
CPC .. G06F 3/0483; G06F 3/04845; G06F 3/0488; H04N 5/91; G10L 13/06; G11B 27/10
See application file for complete search history.

(56) References Cited

U.S. PATENT DOCUMENTS 7,823,056 B1 *  10/2010  Davey ................... G11B 27/34
                                                                    715/202
10,129,579 B2 *  11/2018  Meredith ......... H04N 21/23439
(Continued)

FOREIGN PATENT DOCUMENTS

| JP | 2001-331429 A | 11/2001 |
| JP | 2010-193440 A | 9/2010 |

(Continued)

*Primary Examiner* — Beau D Spratt
(74) *Attorney, Agent, or Firm* — KORUS Patent, LLC; Seong Il Jeong

(57) ABSTRACT

The present invention relates to a method and device which can easily generate moving image content in one take without editing. The present invention provides a method for generating content, the method including: when recording is started, providing a recording interface, including a data display area to which images of the respective pages included in the selected data file are individually and sequentially output, to the touch screen; when a touch input of a user for the data display area of the recording interface is detected, changing and displaying an image displayed in the data display area according to a touch input mode; and generating moving image content by recording changes in image in the data display area and voices of a narrator from a start point of the recording to an end point of the recording.

17 Claims, 8 Drawing Sheets

(56) References Cited

U.S. PATENT DOCUMENTS

| | | | | |
|---|---|---|---|---|
| 2004/0028377 A1* | 2/2004 | Inakura | G11B 27/034 | 386/230 |
| 2008/0288890 A1* | 11/2008 | Anderson | G11B 27/105 | 715/810 |
| 2009/0044117 A1* | 2/2009 | Vaughan | G11B 27/034 | 715/716 |
| 2009/0175599 A1 | 7/2009 | Grim, III et al. | | |
| 2009/0228798 A1* | 9/2009 | Kephart | G11B 27/034 | 715/727 |
| 2010/0131188 A1* | 5/2010 | Yeh | G01C 21/3664 | 701/532 |
| 2010/0295808 A1 | 11/2010 | Seo et al. | | |
| 2011/0078560 A1* | 3/2011 | Weeldreyer | G06F 17/214 | 715/255 |
| 2013/0046834 A1* | 2/2013 | Barber | H04L 12/6418 | 709/206 |
| 2013/0285909 A1* | 10/2013 | Patel | G06F 3/017 | 345/158 |
| 2014/0282089 A1* | 9/2014 | West | H04L 65/403 | 715/753 |
| 2014/0362274 A1 | 12/2014 | Christie et al. | | |
| 2015/0281459 A1* | 10/2015 | Guo | H04M 3/53366 | 370/259 |
| 2015/0378577 A1* | 12/2015 | Lum | G06F 3/048 | 715/720 |
| 2017/0017632 A1* | 1/2017 | York | H04N 7/15 | |
| 2018/0082124 A1* | 3/2018 | Zhang | G06K 9/00718 | |

FOREIGN PATENT DOCUMENTS

| | | |
|---|---|---|
| JP | 2014-153688 A | 8/2014 |
| KR | 10-2012-0076609 A | 7/2012 |
| KR | 10-1518482 B1 | 5/2015 |

\* cited by examiner

METHOD AND DEVICE FOR GENERATING CONTENT

TECHNICAL FIELD

The present invention relates to a method and device for generating content, and more specifically to a method and device which can easily generate moving image content in one take without editing.

BACKGROUND ART

Recently, with the possession of personalized information processing devices by individuals and the expansion of high-speed wired/wireless communication networks, a culture of sharing information and data online has become widespread.

In particular, as the data transmission speeds of wireless communication networks have increased significantly, the sharing of information using moving images has been popularized beyond the conventional sharing of data and information based on text and/or a still image.

However, unlike the creation of content based on text and/or a still image which is not difficult for ordinary persons any longer, the generation and editing of moving image content is still a difficult task for ordinary persons. In particular, a process of editing only required parts by connecting them after recording a moving image is not easy and is burdensome.

In particular, when a moving image intended for a description of a product or education is generated, images and voices of a narrator within the moving image, images of data required for a description, etc. must be recorded together. When the moving image is edited, the images of the narrator must be edited based on the images of the data image at accurate times, and thus a problem occurs in that it is difficult for anyone to easily generate and edit a moving image.

Korean Patent Application Publication No. 10-2012-0121624 discloses a "method for generating a moving image of a lecture on a playing technique." This method is configured to generate a moving image by receiving an instrument playing source sound, receiving a playing moving image, receiving a detailed playing moving image, generating a score for a corresponding instrument of the music of the played source sound, and performing editing through a task of synchronizing the score with the moving images, the source sound, etc.

However, according to this conventional technology, a complex editing process, including the manual synchronization of a source sound, images, etc. constituting content, is required, and thus a problem occurs in that it is difficult for ordinary persons to generate a moving image by using the above method.

Accordingly, there is a need for a technology that is capable of overcoming the above-described problem.

Meanwhile, the above-described background art corresponds to technical information which has been possessed by the present inventor in order to conceive the present invention or which has been acquired in the process of conceiving the present invention, and is not necessarily considered to be a well-known technology that had been known to the public before the filing date of the present invention.

DISCLOSURE

Technical Problem

Accordingly, an object of an embodiment of the present invention is to generate moving image content by easily performing recording in one take in order to eliminate a need for editing.

Furthermore, an object of an embodiment of the present invention is to provide a content generation method and device which can acquire an image of data and an image of a narrator via a single device, thereby eliminating a need to synchronize the image of data and the image of a narrator separately.

Furthermore, an object of an embodiment of the present invention is to provide a content generation method and device which can eliminate the burden of time or cost even when a customized moving image in which a narrator in the moving image varies depending on a reception target is generated.

Technical Solution

As a technical solution for solving at least one of the above technical problems, according to a first aspect of the present invention, there is provided a method for generating content, the method being performed by a content generation device including a touch screen, the method including: receiving a selection of a data file including a plurality of pages from a user; when recording is started, providing a recording interface, including a data display area to which images of the respective pages included in the selected data file are individually and sequentially output and a control area which receives a selection of a touch input mode for the data display area, to the touch screen; when a touch input of the user for the data display area of the recording interface is detected, changing and displaying an image displayed in the data display area according to the touch input mode selected via the control area; when the recording is started, recording changes in image in the data display area, made by changing and displaying the image, until the recording is ended; when the recording is started, activating a microphone included in the content generation device, and recording changes in received sound until the recording is ended; and, when the recording is ended, generating moving image content by storing the changes in image and the changes in sound, recorded from a start point of the recording to an end point of the recording, in synchronization with each other.

According to a second aspect of the present invention, there is provided a device for generating content, the device including a touch screen, the device including: a data registration unit configured to receive a selection of a data file including a plurality of pages from a user; an interface provision unit configured to, when recording is started, providing a recording interface, including a data display area to which images of the respective pages included in the selected data file are individually and sequentially output and a control area which receives a selection of a touch input mode for the data display area, via the touch screen, and also configured to, when a touch input of the user for the data display area of the recording interface is detected, changing and displaying an image displayed in the data display area according to the touch input mode selected via the control; an image acquisition unit configured to, when the recording is started, record changes in image in the data display area until the recording is ended; a sound acquisition unit configured to, when the recording is started, activate a microphone included in the content generation device and record changes in received sound until the recording is ended; and a content generation unit configured to, when the recording is ended, generate moving image content by storing the changes in image and the changes in sound, recorded from a start point of the recording to an end point of the recording, in synchronization with each other.

Advantageous Effects

According to any one of the above-described technical solutions, an embodiment of the present invention can provide the content generation method and device which can easily perform recording in one take, thereby eliminating a need for separate editing work.

Furthermore, according to any one of the above-described technical solutions, there can be provided the content generation method and device which can acquire an image of data and an image of a narrator via a single device, thereby eliminating a need to synchronize the image of data and the image of a narrator separately.

Furthermore, according to any one of the above-described technical solutions, there can be provided the content generation method and device which can eliminate the burden of time or cost even when a customized moving image in which a narrator in the moving image varies depending on a reception target is generated.

The effects that can be obtained in the present invention are not limited to the above-described effects, and other effects which have not been described will be clearly understood from the following description by those having ordinary knowledge in the art to which the present invention pertains.

MODE FOR INVENTION

Figure 1:
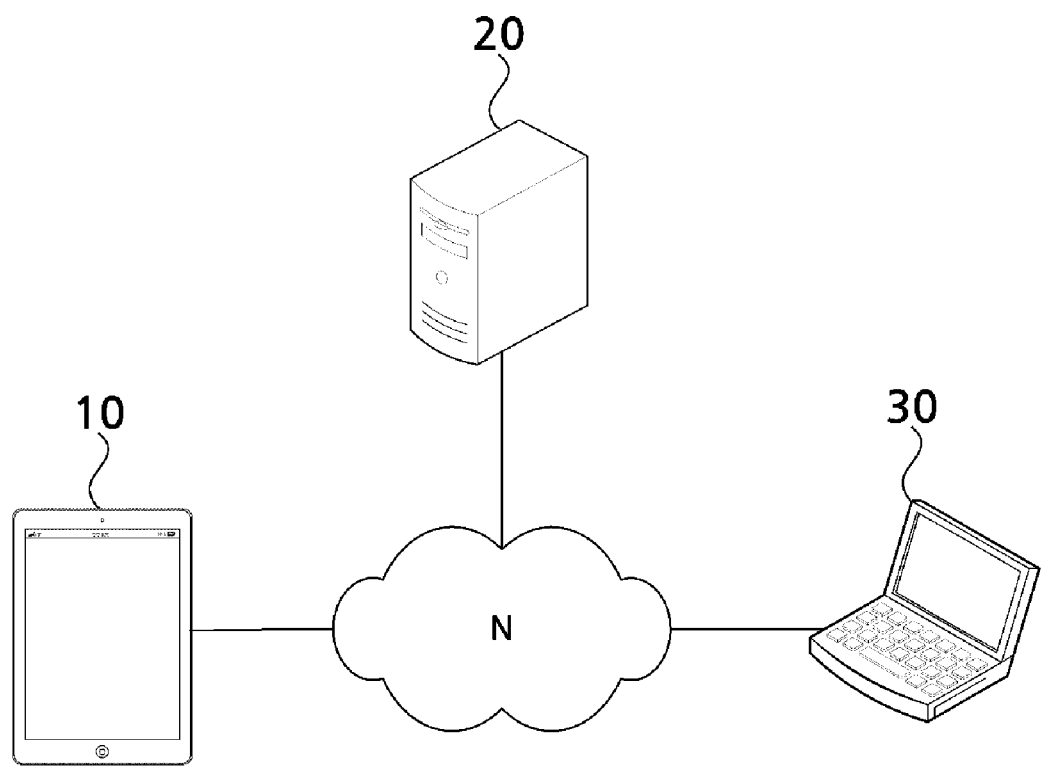
FIG. 1 is a diagram showing the configuration of the network of a content delivery system according to an embodiment of the present invention.

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, parts unrelated to the following description will be omitted in order to clearly describe the present invention. Throughout the specification, similar reference symbols will be assigned to similar components.

Throughout the specification, when a part is described as being "connected" to another part, this includes not only a case where they are "directly connected" to each other but also a case where they are "electrically connected" to each other with another element interposed therebetween. Furthermore, when a part is described as "including" a component, this means that another component is not be excluded from the part but may be included in the part, unless particularly described to the contrary.

The present invention will be described in detail below with reference to the accompanying drawings.

Figure 2:
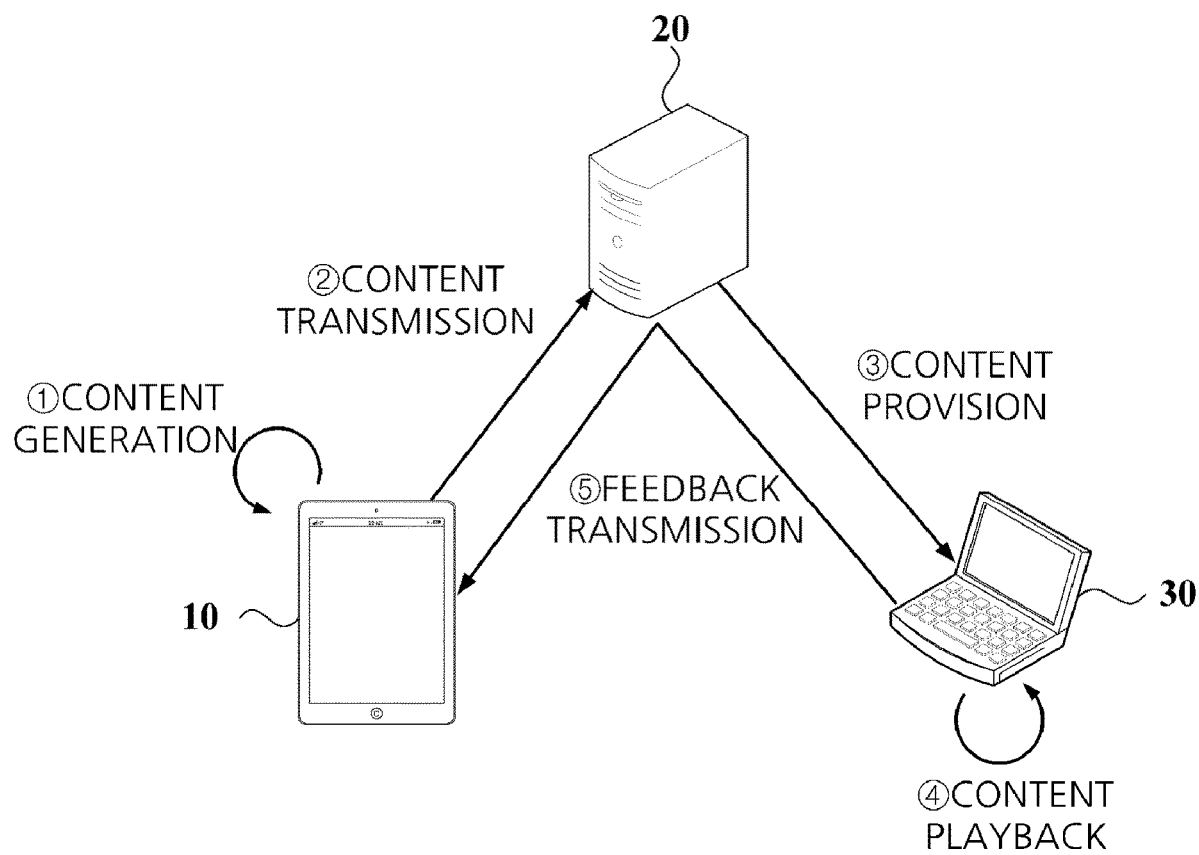
FIG. 2 is a conceptual diagram schematically showing a content delivery process using the content delivery system according to the embodiment of the present invention.

FIG. 1 is a diagram showing the configuration of the network of a content delivery system according to an embodiment of the present invention, and FIG. 2 is a conceptual diagram schematically showing a content delivery process using the content delivery system according to the embodiment of the present invention.

As shown in FIGS. 1 and 2, the content delivery system according to the embodiment of the present invention may be configured to include a content generation device 10, a content delivery server 20, and a content reception device 30 which exchange data with one another over a network N.

In this case, the network N may be implemented as one or more of all types of wired/wireless networks, such as a Local Area Network (LAN), a Wide Area Network (WAN), a Value Added Network (VAN), a Personal Area Network (PAN), a mobile radio communication network, the Wireless Broadband (Wibro) Internet, a Mobile Worldwide Interoperability for Microwave Access (mobile WiMAX) network, a High Speed Downlink Packet Access (HSDPA) network, a satellite communication network, etc.

Furthermore, the content generation device 10 and the content reception device 30 may be each implemented as a computer, a portable terminal, a television, a wearable device, or the like which can access a remote server over the network N or connect with another terminal or a server. In this case, the computer includes, for example, a notebook, a desktop, or a laptop on which a web browser has been installed. The portable terminal is, for example, a wireless communication device ensuring portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a Mobile Worldwide Interoperability for Microwave Access (mobile WiMAX) terminal, a smartphone, a tablet PC, etc. Furthermore, the television may include an Internet Protocol Television (IPTV), an Internet Television (Internet TV), a terrestrial TV, a cable TV, etc. Furthermore, the wearable device is, for example, an information processing device of a type which can be directly worn on a human body, such as a watch, glasses, an accessory, a dress, shoes, or the like, and may access a remote server or connect with another terminal over a network directly or by way of another information processing device.

In particular, the content generation device 10 is composed of a terminal including a touch screen, and includes a camera configured to take an image forward in the front surface thereof on which the touch screen of the content generation device 10 is provided. Furthermore, the content generation device 10 may be provided with a microphone configured to detect and record a sound generated around the content generation device 10. Accordingly, the content generation device 10 may change a displayed screen in response to a touch input of a user applied to the touch screen, and may acquire and record an image and a sound.

Furthermore, a content generation application configured to generate new moving image content by using hardware, such as the above-described touch screen, camera, and/or microphone, and/or the like, may be installed on the content generation device 10. The content generation application may generate new content, and may also communicate with the content delivery server 20 to be described later so that generated content may be delivered to the content reception device 30 to be described later.

Meanwhile, the content reception device 30 may be implemented as a computer, a portable terminal, a television, a wearable device, or the like, as described above, and may receive content from the content delivery server 20 and play back the content.

Meanwhile, in an embodiment of the present invention, the content delivery server 20 is a computer configured to exchange data with a terminal, such as the content generation device 10 or content reception device 30, or another server over the network N. In particular, the content delivery server 20 receives content generated by the content generation device 10, and delivers the content to the content reception device 30. For this purpose, the content delivery server 20 may communicate with the above-described content generation application installed on the content generation device 10, and may provide a webpage used for the delivery of content to the content reception device 30 via the web browser installed on the content reception device 30 or transmit content to the content reception device 30 via a separate application program installed on the content reception device 30.

The interactions between the components are described with reference to the illustration of FIG. 2 in greater detail.

① First, new moving image content may be generated in the content generation device 10.

② Thereafter, the content generated in the content generation device 10 is transmitted to the content delivery server 20 along with information about a content reception target selected by the user of the content generation device 10. In this case, the reception target may not be specified.

③ Accordingly, the content delivery server 20 having received the content stores the received content, and provides the received content to one or more content reception devices 30. For example, when a specific reception target is specified by the content generation device 10, the content delivery server 20 may notify the content reception device 30 having accessed the delivery server 20 that new content will be delivered by using a user account corresponding to the reception target content. When the user of the content reception device 30 requests the provision of the new content in response to the notification, the stored content may be provided. In this case, it will be apparent that the content may be provided using a streaming method or in a downloadable form.

In this case, the content delivery server 20 may provide content via a webpage, as described above. In this case, by using the web browser installed on the content reception device 30, the content reception device 30 may detect the reception of the content, and may request the playback of the content from the content delivery server 20. Meanwhile, the content delivery server 20 may provide the content to the reception target by communicating with a separate application program (hereinafter referred to as the "content playback application") installed on the content reception device 30. In this case, a user corresponding to the reception target may execute the content playback application installed on the content reception device 30, and may detect the reception of the new content and request the playback of the detected content via the executed content playback application.

In this case, even when the user corresponding to the reception target does not access the content delivery server 20 by using the content reception terminal 30, the content delivery server 20 may provide notification that the new content has been delivered to the reception target through the provision of push notification to the reception target or the like. For example, the content delivery server 20 may provide notification that the new content has been delivered to the reception target by sending push notification for the content playback application installed on the content reception device 30. Alternatively, notification of the reception of the new content may be provided in the form of a short message service (SMS) message by using a mobile communication telephone number registered for the reception target in advance.

④ Moreover, the content reception device 30 may view the content received from the content delivery server 20 by playing back the content.

⑤ In this case, the content delivery server 20 may manage information about whether each piece of content has been received or not by determining whether a request for the provision of the content has been received from the content reception device 30, and may provide information about the content has been received to the content generation device 10 which has delivered the content. In other words, the content delivery server 20 may provide information about whether the reception target of the content has detected the received content to the user who has generated and transmitted the content. Furthermore, in this case, the content delivery server 20 may receive feedback data, including a message, a request, or the like which the reception target desires to, in turn, transmit to a content generator with respect to the delivered content, from the content reception device 30 having received the content, may store the feedback data, and may provide the feedback data to the content generation device 10.

Figure 3:
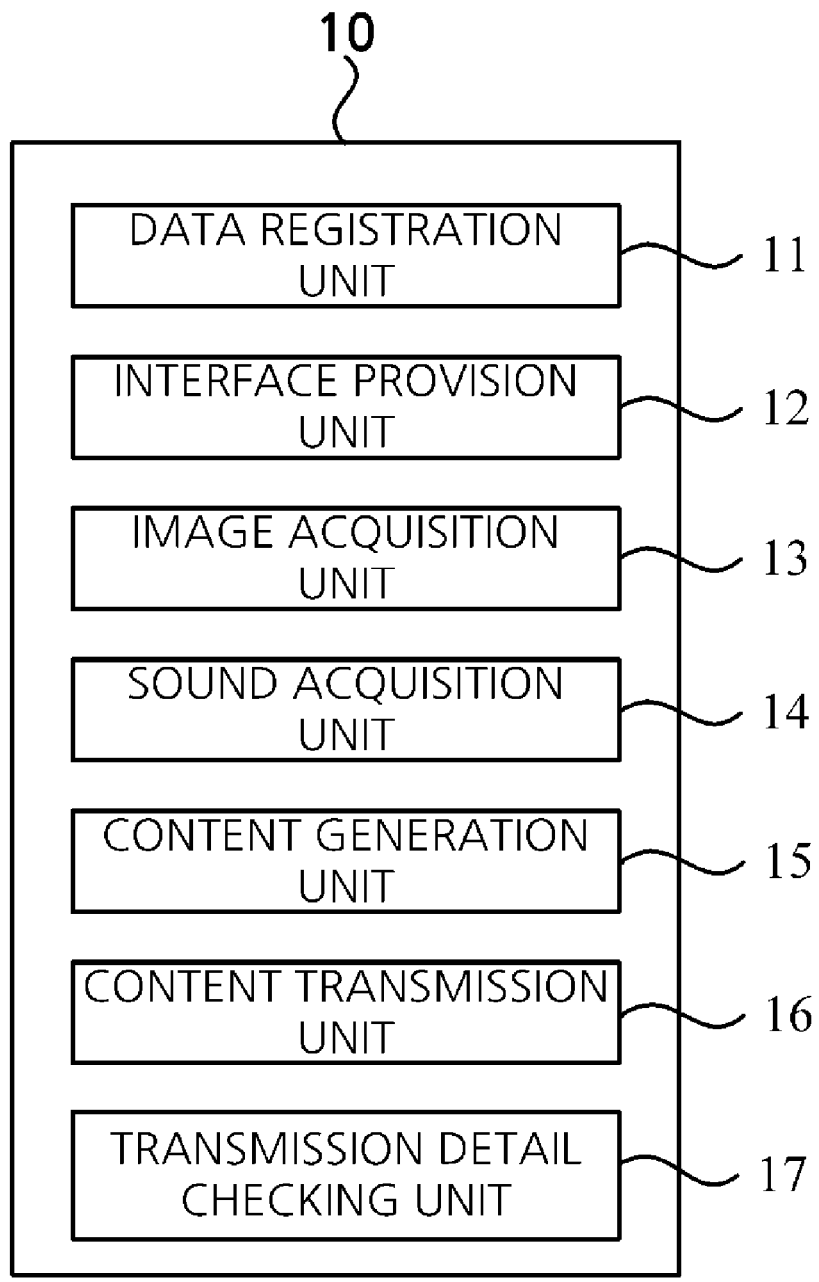
FIG. 3 is a block diagram showing the functional configuration of a content generation device according to the embodiment of the present invention.
Figure 4:
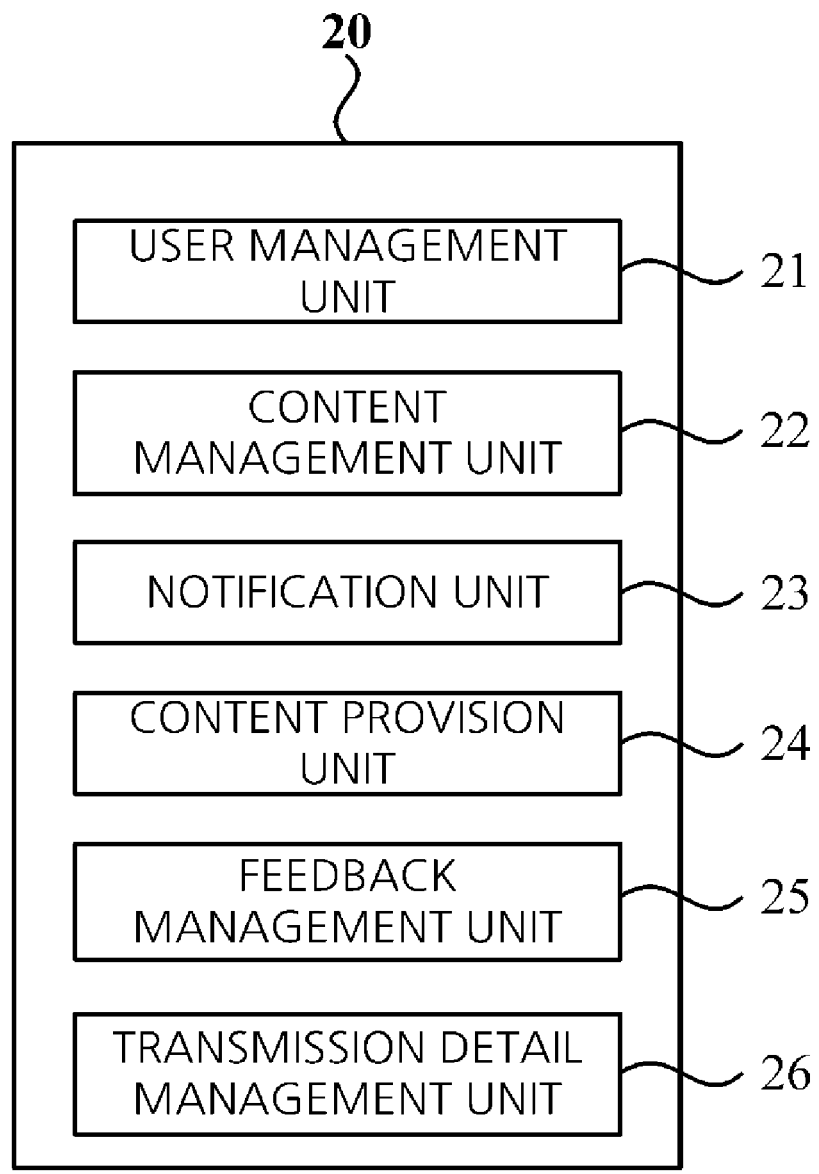
FIG. 4 is a block diagram showing the functional configuration of a content delivery server according to the embodiment of the present invention.
Figure 5:
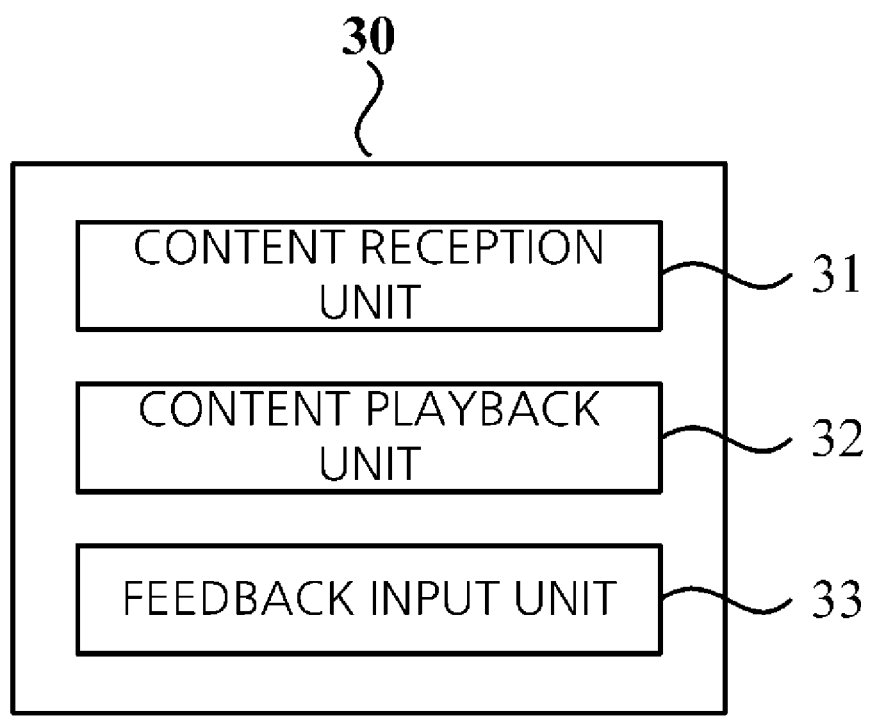
FIG. 5 is a block diagram showing the functional configuration of a content reception device according to the embodiment of the present invention.

In the following, referring to FIGS. 3 to 5, the functional configurations of the above-described content generation device 10, content delivery server 20 and content reception device 30 included in the content delivery system according to the embodiment of the present invention are described in greater detail. FIG. 3 is a block diagram showing the functional configuration of the content generation device according to the embodiment of the present invention, FIG. 4 is a block diagram showing the functional configuration of the content delivery server according to the embodiment of the present invention, and FIG. 5 is a block diagram showing the functional configuration of the content reception device according to the embodiment of the present invention.

First, the configuration of the content generation device 10 is described with reference to the illustration of FIG. 3. As shown in the drawing, the content generation device 10 includes a data registration unit 11 configured to receive a selection of data file from a user. The data registration unit 11 may receive a selection of at least one data file from the user. In this case, the "data file" may be a typical document file. Although the data file may be, for example, an electronic document having an extension "pdf," "doc," "hwp," "ppt," or "html," or the like, the "data file" is not limited thereto. For example, the data file may include a plurality of image files.

In particular, the data file may include one or more pages. In this case, the "page" is a delimiting unit for data constituting the data file. In particular, the "page" may be a delimiting unit for the amount of data which is displayed on a screen at a time. In this case, the user may select two or more data files, in which case the data registration unit 11 may receive settings of the priorities of the two or more data files from the user in advance. The data registration unit 11 receives a selection of a data file before the recording of moving image content is started.

Furthermore, selectively, the data registration unit 11 may receive a selection of data or a selection of an object from the user, i.e., a moving image generator. In this case, the object is an object corresponding to a subject of content included in moving image content to be newly generated. For example, when the content generator desires to include content adapted to describe a specific product in moving image content, the user of the content generation device 10 may select the corresponding product as the object. In this case, the data registration unit 11 may provide a list of pieces of data, registered in advance for the selected object, to the user, and the user may select corresponding data.

Alternatively, the data registration unit 11 may receive selections of both a data file and an object.

In this case, the data registration unit 11 may receive a list of objects or a list of pieces of data, which is provided in order to receive a selection of an object or a selection of data registered in advance for a selected object from the user, from the content delivery server 20.

Furthermore, the content generation device 10 according to the embodiment of the present invention includes an interface provision unit 12. The interface provision unit 12 provides a user interface, required for the content generation device 10 to generate moving image content, via the touch screen of the content generation device 10.

When the recording of a moving image is started, i.e., when the user inputs a command to start the recording of the moving image, the interface provision unit 12 provides a recording interface, including a data display area configured such that images of respective pages included in the data file whose selection has been received by the data registration unit 11 are sequentially and individually output thereto and a control area configured to receive a selection of a touch input mode for the data display area, via the touch screen. Furthermore, the recording interface may further include a narrator display area. An image which is acquired via the camera provided in the front surface part of the content generation device 10 may be displayed in the narrator display area. In this case, it will be apparent that the image which is displayed in the narrator display area may be an image acquired via a camera provided in the back surface part of the content generation device 10.

Figure 7:
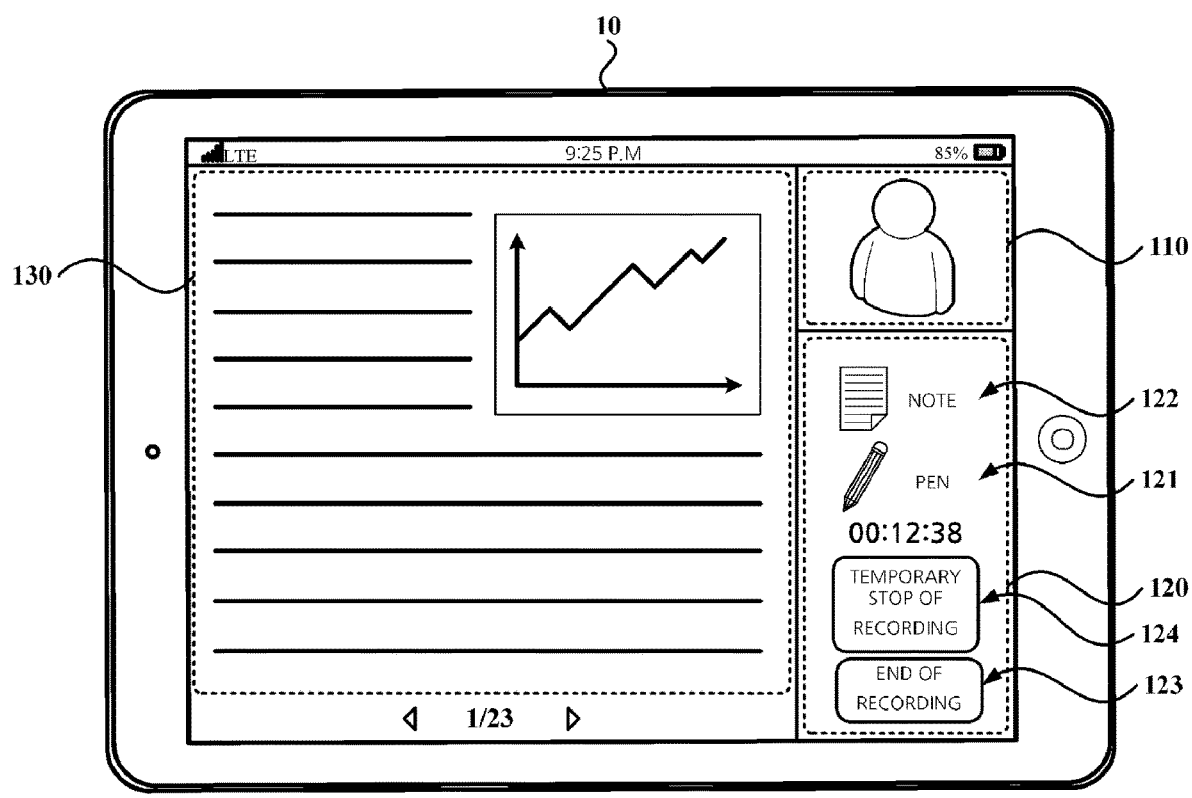
FIGS. 7 and 8 are views showing examples to illustrate the content generation method according to the embodiment of the present invention.

For example, as shown in FIG. 7, the narrator display area 110, the control area 120, and a data display area 130 may be demarcated from one another and arranged on the touch screen of the content generation device 10.

In this case, pages included in selected one or more data files may be displayed in the data display area one at a time. For example, when a single data file including a plurality of pages is selected, an image of a first page may be displayed in the data display area first, and then the following pages may be sequentially changed and displayed according to the command of the user. Furthermore, for example, when two or more data files are selected, display starts from an image of a first page of a first data file. When images of all pages of the first data file have been changed according to the command of the user, sequential changes and display may start from an image of a first page of a subsequent next data file.

In this case, a method of changing a page will be described later.

Furthermore, a software button configured to receive a selection of the start, end, or temporary stop of recording may be provided in the control area. Furthermore, at least one selection button configured to receive a selection of a touch input mode adapted to determine how to process a touch input of the user which occurs within the above-described data display area. In this case, it will be apparent that the selection button is provided as a software button.

In this case, the touch input mode may not be necessarily changed by the selection button included in the control area, but may be changed according to a touch input pattern applied to the data display area. As an example, a configuration may be made such that when a touch input is applied to the same location for a set time or more, the touch input mode is changed. In this case, the selection button for the selection of the touch input mode may not be provided in the control area.

In this case, the touch input mode includes at least two different input modes regarding whether to determine that a touch input of the user detected in the data display area is an input adapted to change the display state of an image of a page displayed within the data display area and whether to determine that a touch input of the user detected in the data display area is an input adapted to additionally display new data on an image of a page displayed within the data display area. In other words, the touch input mode may include: a page control mode configured to perform at least one of the enlargement, reduction, and movement of an image of a currently displayed page, and the changing of a displayed image to an image of another page in response to an touch input of the user; and an image addition mode configured to additionally display a new image corresponding to the trajectory of a touch input of the user on an image of a currently displayed page. In this case, the content generation device 10 may display a specific image adapted to enable the user to identify whether a current touch input mode is a page control mode or an image addition mode in a specific area of the recording interface, thereby allowing the user to identify the current touch input mode with the naked eye.

In this case, the control area may occupy only a minimum area which does not overlap the data display area during recording, and may be displayed on the data display area in a separate layer while encroaching on at least part of the data display area when recording is temporarily stopped. In other words, the size and location of the control area may be changed depending on whether a state in question is a state of ongoing recording or a state in which recording is temporarily stopped after being started. Furthermore, the type, size, shape, etc. of the software button displayed in the control area may be also changed. It will be apparent that the control area may be displayed in the same manner regardless of whether a state in question is a state of ongoing recording or a state in which recording is temporarily stopped after being started.

For example, the control area may simply display only a button adapted to select between a recording temporary stop button and a touch input mode during recording, and may further display various buttons adapted to receive a setting of the color or thickness of an line image added according to the trajectory of a touch input in an image addition mode while extending over the data display area in a separate layer in a recording temporary stop state. It will be apparent that the color or thickness of a line image added to the data display area does not necessarily need to be selected by the user.

The color or thickness of a line may be automatically selected by the content generation device 10, or may be fixed to a predetermined color or thickness. For example, the content generation device 10 may select the color of a line image to be added to the data display screen in accordance with the color of a data image, which is the background of the line. For example, the content generation device 10 may adjust the color of a line image to a color distinctive from the color of at least part of the data display area to which the line image is added in the image addition mode, for example, to a complementary color, or may select the color as the color of the line image.

Meanwhile, an image acquired via the camera provided in the front surface part of the content generation device 10 is displayed in the narrator display area in real time, as described above, and thus an image of a narrator who is currently generating moving image content by using the content generation device 10, i.e., a content generator, may be displayed in the narrator display area. In other words, an image acquired in real time by the camera is displayed without change in the narrator display area included in the recording interface, and thus a narrator who performs recording may check the display state of the data display area while checking his or her appearance via the narrator display area in real time.

When a touch input of the user for the above-described data display area is detected, the interface provision unit 12 which provides a recording interface divided into the at least three different areas, as described above, may change and display an image displayed in the data display area according to the touch input mode which is selected via the selection button provided in the control area.

In other words, in a state where the page control mode has been selected via the selection button provided in the control area, the interface provision unit 12 enlarges, reduces, or moves an image of a currently displayed page or changes a displayed image to an image of another page when a touch input of the user occurs in the data display area.

For example, when a touch input of the user corresponding to a swipe operation in a predetermined direction is detected in the data display area in the page control mode, the interface provision unit 12 may change a displayed image from an image of a currently displayed page to an image of another page, and may display the image of another page. For example, when the occurrence of a left swipe operation (a touch and drag operation from the right to the left) is detected in the data display area, the interface provision unit 12 stops the output of a current page image, and displays an image of a subsequent page in the data display area. In this case, during a process of changing a displayed image from an image of a currently displayed page to an image of a subsequent page and displaying the image of a subsequent page, each of the page images may be displayed while sliding in a direction corresponding to that of a swipe operation. Furthermore, for example, when a right swipe operation is detected in the data display area, the interface provision unit 12 may stop the output of a current page image, and may output an image of a previous page.

It will be apparent that in parallel with this, a change in page image may be made via a separate software button or the user's selection of a thumbnail image of each page of a data file.

In other words, in an embodiment of the present invention, when the touch input mode is the page control mode, a swipe operation may be recognized as a page change command. It will be apparent that a page change command is not necessarily recognized via a touch input in the data display area in all embodiments of the present invention, a page change may be made in such a manner that a software button for a page change is displayed on one side (which may be outside the data display area 120 or may be within the control area) of the data display area 120 and the user selects the button by touching it, as shown in the embodiment shown in FIG. 7.

As described above, in the present invention, when generating a moving image by using a data file including a plurality of pages, a content generator may perform recording while changing pages of data without stopping the recording during the recording of the moving image, in which case changes in image in the data display area attributable to changes of pages are combined with other pieces of recording data, i.e., an image of a narrator and sound data, into a single piece of moving image content, thereby facilitating a recording process.

Furthermore, when the touch input mode is the above-described page control mode and a touch input of the user corresponds to a pinch-to-zoom operation (an operation of zooming in when two touch points become close to each other and zooming out when they become far from each other), the interface provision unit 12 may enlarge or reduce an image of a currently displayed page, and may then display it.

Moreover, in a state where the touch input mode is the page control mode and an image of a currently displayed page has been enlarged, when a touch and drag operation occurs in the data display area, the interface provision unit 12 may move the display location of a currently displayed page across the data display area in accordance with the trajectory of a touch and drag input.

Meanwhile, when the touch input mode is the image addition mode, the interface provision unit 12 additionally displays an image, having a trajectory of a shape corresponding to that of the trajectory of a touch input of the user occurring in the data display area, on an image of a page of a data file already displayed in the data display area. In other words, when the user draws a line, draws a circle, or writes a letter as desired, the line, circle, or letter may be additionally displayed on displayed data.

Furthermore, the touch input mode provided by the interface provision unit 12 may further include a text input mode in addition to the above-described page control mode and the image addition mode. In the text input mode, a virtual keypad may be displayed on a page image on one side of the data display area in a separate layer, and the user may input desired text via the virtual keypad. The input text may be displayed on the page image in an overlapping manner. In this case, the virtual keypad displayed in the text input mode may be displayed along with the control area which is extended only in the state of the temporary stop of recording.

As described above, the interface provision unit 12 may separately display the data display area, the control area, and the additional narrator display area on the touch screen. In particular, for a touch input of the user detected in the data display area, the processing method thereof may vary according to the touch input mode whose selection has been received from the user via the control area.

Meanwhile, the content generation device 10 according to the embodiment of the present invention includes an image acquisition unit 13. The image acquisition unit 13 acquires a moving image by recording changes in images, displayed in the data display area provided by the interface provision unit 12, from a recording start point to a recording end point. In this case, the image acquisition unit 13 records changes in images, displayed in the data display area, from the recording start point of moving image content, i.e., the point at which a user issues a command to start recording, until the recording is ended. For example, when the displayed state of a page is enlarged, reduced, or moved, or a displayed page is changed to another page in the page control mode, all changes in images displayed in the data display area, including the above changing process, are recorded without change over time. Furthermore, for example, when the user draws a line or circles a specific word along a specific text string of an image of a currently displayed page in the image addition mode, changes in images in the data display area, including the process of drawing the line or circling a specific word, are recorded without change.

Furthermore, the image acquisition unit 13 may record changes in images displayed in the above-described narrator display area without change from a recording start point to a recording end point. In other words, the image acquisition unit 13 may record an image acquired by the camera provided in the front surface part of the content generation device 10.

In particular, the image acquisition unit 13 may generate a single moving image, including both an image of data and an image of a narrator, in one take without a separate synchronization task by simultaneously capturing changes in images in the data display area and the narrator display area included in the recording interface. Furthermore, the image acquisition unit 13 may acquire changes in images in the overall screen, on which the recording interface is displayed, as a single moving image in one take.

In this case, the image acquisition unit 13 may generate an independent sub-image whenever a command to temporarily stop recording is input in an embodiment. Each sub-image may include changes in images in the data display area and the narrator display area which are acquired over a corresponding time interval. Furthermore, in an embodiment of the present invention, once individual sub-images have been acquired, a content generation unit 15 to be described later may generate each piece of sub-content by synchronizing changes in sound, acquired by a sound acquisition unit 14 to be described later over a time interval over which a corresponding sub-image is acquired, with the sub-image.

Furthermore, the content generation device 10 according to the embodiment of the present invention includes the sound acquisition unit 14. The sound acquisition unit 14 may record changes in sound, detected by the microphone provided in the content generation device 10, from a recording start point to a recording end point. In this case, the changes in sound recorded by the sound acquisition unit 14 may be recorded in synchronization with changes in images displayed in the data display area and narrator display area of the above-described touch screen. In this case, the sound acquisition unit 14 may generate each sub-sound whenever recording is temporarily stopped, and may synchronize the sub-sound with the above-described sub-image.

Furthermore, the content generation device 10 according to the embodiment of the present invention further includes the content generation unit 15. When the user inputs a command to end recording, the content generation unit 15 generates a single piece of moving image content by storing both changes in image in the data display area and the narrator display area and changes in sound, which have been recorded from a recording start point to the point at which the end command is input. In this case, the content generation unit 15 stores images and sounds of data and a narrator as a single package by synchronizing the images and sounds of the data and the narrator in accordance with the times at which the data were actually acquired. In this case, the content generation unit 15 may encode or compress the content into a predetermined file type when required.

Furthermore, when recording is not completed in one take but is temporarily stopped during the recording, the content generation unit 15 may generate sub-content whenever the recording is temporarily stopped, and may complete a single piece of content by connecting pieces of sub-content in temporal sequence.

Furthermore, when recording is temporarily stopped or ended, the clips of pieces of sub-content generated by the image acquisition unit 13 may be arranged in temporal sequence, and the narrator may select part of the clips and may delete it, replace it with different sub-content, or change its sequential position.

In this case, after the recording has been ended, the user may check individual pieces of sub-content by playing back them in advance before generating a single piece of content by combining the individual pieces of sub-content. Furthermore, in this case, background music may be selected for and inserted into each piece of sub-content or a finally generated single piece of moving image content. In this case, the sound volume of the background music may be automatically tuned to the sound volume of the content before the background music is inserted thereto, and two types of sound, i.e., the background music and the sound acquired by the sound acquisition unit 14, may be simultaneously encoded.

Furthermore, in an embodiment, the content generation unit 15 tags newly generated content with information about an object whose selection is received from the user by the data registration unit 11. Accordingly, when the generated content is delivered to the content delivery server 20, the content delivery server 20 can recognize the object to which the corresponding content is related.

Meanwhile, the content generation device 10 according to the embodiment of the present invention may further include a content transmission unit 16. The content transmission unit 16 may transmit content, finally generated by the content generation unit 15, to the content delivery server 20, thereby enabling the content to be delivered to a reception target selected by the content generator or a reception target having requested the viewing of the corresponding content from the content delivery server 20. In this case, the content transmission unit 16 may receive a selection of a reception target, which will receive content, from the content generator before the content is generated or after the generation of the content has been completed.

In this case, the selection of the reception target may be performed by selecting the user account of the reception target or user identification information corresponding thereto which is used in a content provision service which is provided to a plurality of content reception devices 30 by the content delivery server 20. In other words, the content delivery server 20 may provide the identification information of one or more different users, to whom content may be delivered, to the content generation device 10, and the content generator may specify a reception target by selecting at least one of them. It will be apparent that the content generation device 10 may not select a reception target.

For example, in an embodiment of the present invention, the user of the content generation device 10 may form friendships or acquaintanceships with other members in the capacity of a member who has subscribed to a content provision service which is provided by the content delivery server 20, in which case the content generator may designate the reception target of content by selecting one of the other members who have friendships or acquaintanceships with the content generator.

Alternatively, for example, in an embodiment of the present invention, two different types of members may present in a content provision service which is provided by the content delivery server 20. Of these types of members, one type of members may become content generators, and the other type of members may become reception targets. In other words, in this case, a list of the pieces of identification information of all the members of a type different from the type of content generator may be provided to the content generation device 10 of the content generator, and the content generator may specify any one of them as a reception target.

Accordingly, the content transmission unit 16 may transmit information about the specified reception target and generated content to the content delivery server 20, thereby enabling the content delivery server 20 to deliver the content to the reception target.

Meanwhile, in the embodiment of the present invention, a transmission detail checking unit 17 may be additionally provided in the content generation device 10. The transmission detail checking unit 17 may provide information about the details of the generation and transmission of content in the content generation device 10 to the user. In other words, the user may identify delivered content, a reception target, and delivery time via the information about the details. Such information about transmission details may be recorded in the content generation device 10 in a cumulative manner, and the content delivery server 20 may record information about transmission details and provide the information when the user of the content generation device 10 desires to check transmission details.

In particular, the details of the transmission of content may further include information about whether the reception target of content has received the content or not. Furthermore, feedback information which a reception target, in turn, transmits to a content generator after receiving content via the content reception device 30 may be collected via the content delivery server 20, and may be, in turn, provided to the content generation device 10 of the content generator. In other words, the details of the transmission of content may include not only information about whether a reception target has received content or not but also feedback information when the reception target inputs the feedback information.

In this case, of the above-described components of the content generation device 10, the data registration unit 11, the interface provision unit 12, the image acquisition unit 13, sound acquisition unit 14, and the content generation unit 15 may be implemented by above-described content generation application, and the content transmission unit 16 and the transmission detail checking unit 17 may be implemented in such a manner that the web browser of the content generation device 10 executes a webpage which is provided to the content generation device 10 by the content delivery server 20. Alternatively, it will be apparent that all the components may be implemented by a single content generation application.

Meanwhile, as shown in FIG. 4, the content delivery server 20 according to the embodiment of the present invention may include a user management unit 21. The user management unit 21 may assign different user accounts to respective members who have subscribed to the content provision service which is provided by the content delivery server 20, and may check an approaching user for his or her account when the content generation device 10 or content reception device 30 approaches the content delivery server 20. Furthermore, the user management unit 21 may manage a list of friend or acquaintance members of a member corresponding to each user account.

Furthermore, the content delivery server 20 according to the embodiment of the present invention may include a content management unit 22. The content management unit 22 stores pieces of content received from content generation devices 10. In this case, the content management unit 22 may store information about the generator of each piece of content, information about the reception target of the content, reception time, etc. in association with the content.

Furthermore, the content delivery server 20 according to the embodiment of the present invention may further include a notification unit 23 configured to, when the content management unit 22 has received content from the content generation device 10, notify the content reception device 30 of a member corresponding to the reception target of the corresponding content or the personalized device of another member of the reception of the content. When content having a member corresponding to a specific user account as a reception target has been received, the notification unit 23 may transmit push notification to the corresponding user account, or may deliver an SMS message to the mobile communication terminal of the corresponding member. In this case, the push notification or SMS message may include information about a content generator or information about the fact that the content has been received. Furthermore, additionally, a URI scheme which executes a webpage URL adapted to stream or download the received content or the content playback application installed on the content reception device 30, thereby enabling the corresponding content to be immediately played back, may be included in the SMS message or push notification.

Meanwhile, the content delivery server 20 according to the embodiment of the present invention includes a content provision unit 24. The content provision unit 24 may provide information about content received with a member set as a reception target to the corresponding member. For example, when a member approaches the content delivery server 20 via the content reception device 30, the content provision unit 24 may provide a list of all pieces of content delivered with the corresponding member set as a reception target or a list of new pieces of content delivered with the corresponding member set as a reception target to the content reception device 30. Furthermore, when the member corresponding to the reception target may request playback by selecting specific content from the content list provided by the content delivery server 20, the content provision unit 24 may enable the content to be played back on the content reception device 30 by delivering the content stored in the content management unit 22 to the content reception device 30.

Furthermore, the content delivery server 20 according to the embodiment of the present invention may further include a feedback management unit 25. The feedback management unit 25 may record the details of a playback request for content received from the content reception device 30 to the content delivery server 20, or the details of content provided from the content delivery server 20 to a specific content reception device 30, thereby managing information about whether each piece of content has been received by a reception target. Furthermore, when feedback information on content delivered from the content provision unit 24 to the content reception device 30 is received from the content reception device 30, i.e., when a reception target plays back the content and, in turn, delivers comments, such as an opinion, a request, or the like, related to the content, the feedback management unit 25 records the feedback information delivered as described above.

Furthermore, the content delivery server 20 according to the embodiment of the present invention may further include a transmission detail management unit 26. The transmission detail management unit 26 may integrate information about the time when the content generation device 10 generated content and transmitted the content to the content delivery server 20, information about a content generator and a reception target, information about whether the reception target has received the content or not recorded by the feedback management unit 25, and feedback information based on each on a per-content basis, and may provide the integrated information to the transmission detail checking unit 17 of the above-described content generation device 10. Furthermore, various types of information based on the content may be delivered to the content reception device 30 corresponding to the reception target of the corresponding content.

Furthermore, the content delivery server 20 according to the embodiment of the present invention may selectively identify the object of content by using each piece of received content tagged with object information, and may classify pieces of content by grouping a plurality of pieces of contents tagged with the same object information.

Furthermore, in order for a content generator to indicate the object of content as described above, the content delivery server 20 may store information about a plurality of objects in advance, and may provide a list of objects to the content generation device 10. Furthermore, when data files for respective objects are uploaded to the content delivery server 20, a list of data files associated with a specific object may be delivered to the content generation device 10 in the same manner, thereby enabling a content generator to generate moving image content by selecting a data file even when the content generator does not directly register data files.

Furthermore, the content delivery server 20 may provide another piece of additional information corresponding to a specific object associated with content to the content reception device 30 when providing the content associated with the specific object.

Meanwhile, as shown in FIG. 5, the content reception device 30 according to the embodiment of the present invention includes a content reception unit 31. When there is content received from the content delivery server 20 with the user of the content reception device 30 set as a reception target, the content reception unit 31 delivers a content list to the content reception device 30. In this case, when a user selects specific content included in the list delivered to the content reception device 30 and requests playback, the content reception unit 31 delivers the selected content to the content reception device 30.

Accordingly, when the moving image content is delivered to the content reception device 30, the content playback unit 32 of the content reception device 30 plays back the delivered content. In this case, the content playback unit 32 may output synchronized images and sounds, and may play back the content by displaying an image including changes in images displayed in the data display area during the recording of the content and an image displayed in the narrator display area in different areas of a single screen of the content reception device 30.

Furthermore, the content reception device 30 according to the embodiment of the present invention may further include a feedback input unit 33. The feedback input unit 33 may receive a selection or input of feedback information while the content playback unit 32 is playing back specific content or after the playback of specific content has been completed.

The feedback information may be, for example, text information including a query or new request related to moving image content, or information about a selected one of one or more requests standardized by the content delivery server 20 in advance. For example, when the types of feedback information designated in advance by the content delivery server 20 are predetermined to be a "visit request," and a "product order" in advance, a reception target may select at least one of the determined types of feedbacks, and may deliver the selected feedback to a content generator.

Meanwhile, in an embodiment, when providing content to the content reception device 30, the content delivery server 20 may also deliver a hyperobject hyperlinked to an online sale or order page for a corresponding object to the content reception device 30 or provide other pieces of content associated with the corresponding object as recommended content based on object information with which the corresponding content is tagged. Accordingly, the hyperobject or a recommended content list may be displayed on one side of the content which is played back by the content playback unit 32.

Figure 6:
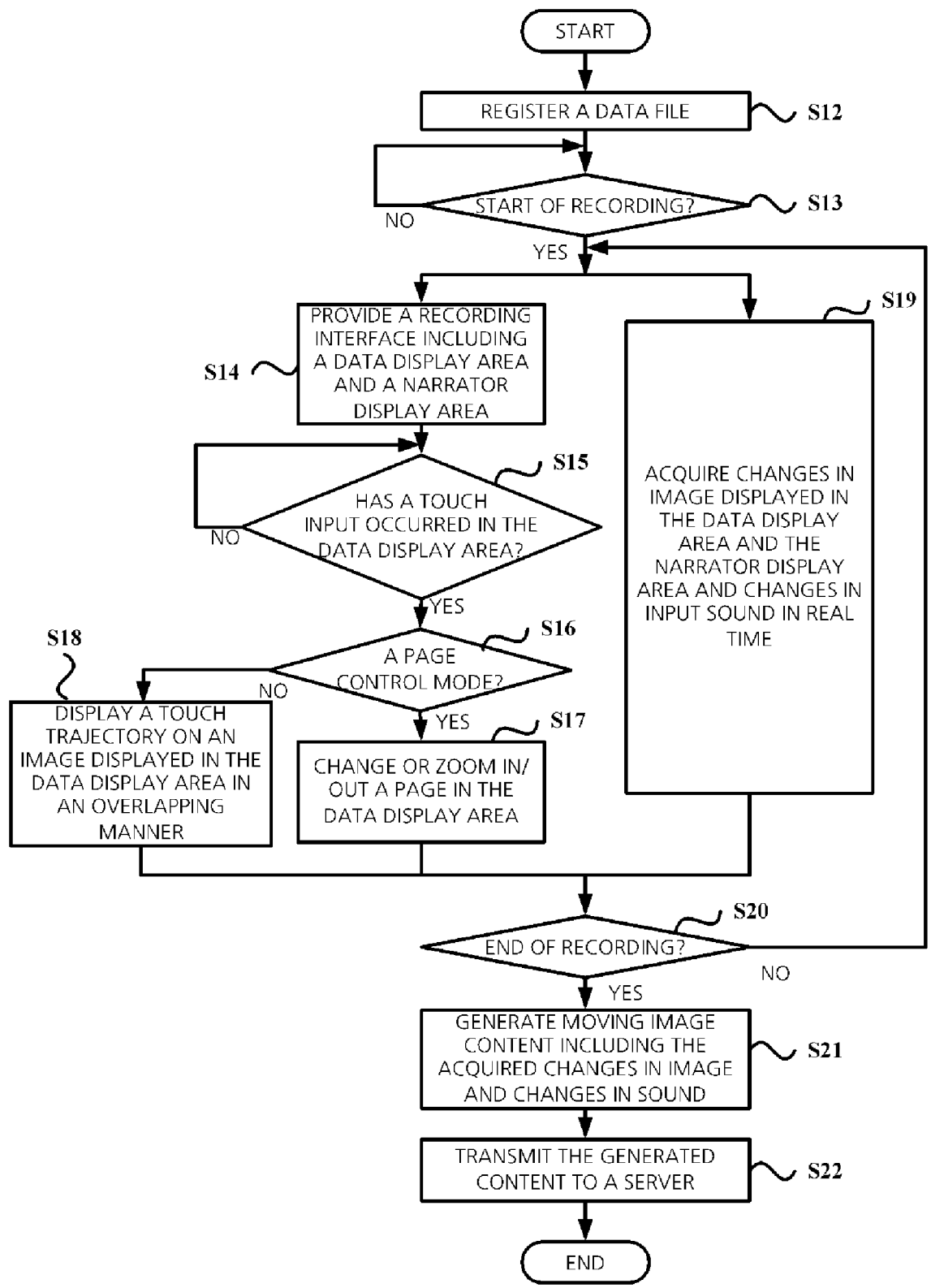
FIG. 6 is a flowchart showing a content generation method according to an embodiment of the present invention in a stepwise manner.
Figure 8:
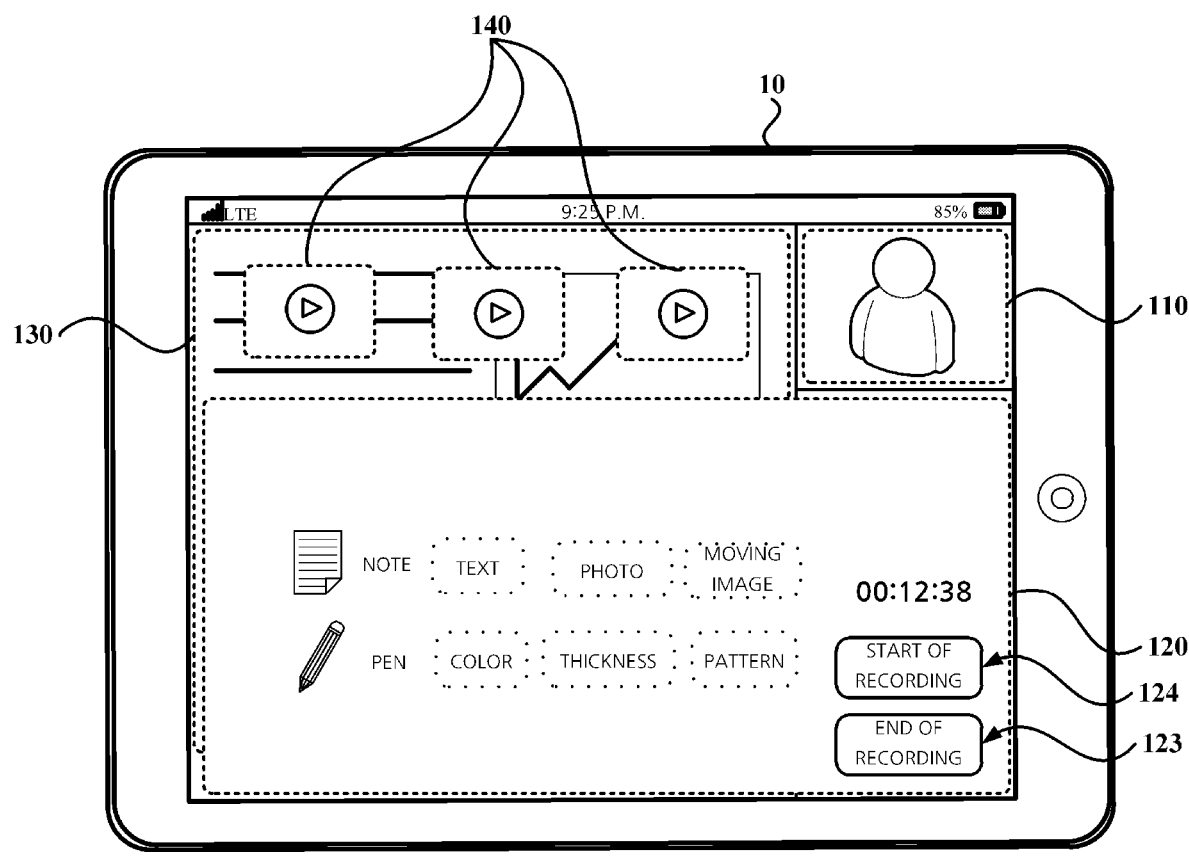

A content generation method using the content delivery system according to the above-described embodiment of the present invention will be described below with reference FIGS. 6 to 8 in a stepwise manner. However, the method which will be described below will be described with a focus on the steps which are performed by the content generation device 10. FIG. 6 is a flowchart showing a content generation method according to an embodiment of the present invention in a stepwise manner, and FIGS. 7 and 8 are views showing examples to illustrate the content generation method according to the embodiment of the present invention.

As shown in FIG. 6, first, the content generation method according to the embodiment of the present invention includes step S12 of receiving a selection of a data file to be displayed in the data display area of moving image content. In this case, a user may select at least one of data file stored in the content generation device 10, or may select at least one of data files provided by the content delivery server 20. In particular, in an embodiment, the user may select an object first and then select a data file corresponding to the object, or may select an object and a data file independently. Furthermore, in this case, the user may also select the reception target of content.

Thereafter, the content generation device 10 may receive a command to start recording from the user at step S13. For this purpose, the content generation device 10 may display a recording start button on the touch screen, and may receive a selection thereof from the user.

When recording is started, the content generation device 10 may provide a recording interface including the above-described data display area at step S14. Furthermore, the recording interface may include both a control area and a narrator display area. For example, as shown in FIG. 7, the touch screen of the content generation device 10 may demarcate and display the narrator display area 110, the control area 120, and the data display area 130.

In this case, an image acquired by the camera in the front surface part of the content generation device 10 may be displayed in the narrator display area 110 in real time.

Furthermore, one or more selection buttons configured to control a recording process may be provided in the control area 120. First, a recording button 123 configured to determine a recording start point and a recording end point may be provided. The recording button 123 is a button configured to input a command to start recording before the start of recording. After the start of the recording, the recording button 123 may be switched to an input button configured to input a command to end recording. Furthermore, a temporary stop button 124 configured to selectively and temporarily stop recording may be further provided.

Furthermore, in an embodiment of the present invention, the control area 120 may include at least one software button configured to determine a touch input mode. For example, as shown in FIG. 7, a pen button 121 and a note button 122 may be provided. In a state where the two buttons are not active, the content generation device 10 operates in a page control mode in which all touch inputs detected in the data display are all recognized as signals adapted to control the enlargement, reduction, movement, and changing of a page image displayed in the data display area. Meanwhile, for example, in a state where the pen button 121 has been activated, the content generation device 10 operates in an image addition mode in which touch inputs within the data display area are all recognized as touch pen inputs, and thus the trajectory of touch inputs is displayed on the data display area in the form of an image. In an embodiment, in a state where the pen button 121 has been selected, a user interface configured to receive selections of the color and thickness of a pen may be at least temporarily displayed in the control area 120.

Furthermore, in a state where the note button 122 has been activated, the user may input text via a virtual keyboard. In this case, although the content generation device 10 displays the virtual keyboard on at least one side of the data display area in a higher layer in an overlapping manner, a moving image generated by the content generation device 10 may include only changes in image within the data display area in a layer lower than that of the virtual keyboard, and the virtual keyboard layer displayed during the recording process may be excluded from the moving image.

In this case, the pen button 121 and the note button 122 may be selectively activated.

Meanwhile, in this case, when the temporary stop button 124 is selected, the recording interface may be changed, as shown in FIG. 8. In other words, the control area 120 is extended while encroaching on at least part of the data display area 130 in a higher layer. Furthermore, software buttons which are not displayed before temporary stop may be additionally displayed within the control area 120.

Furthermore, in a temporary stop state, thumbnail images 140 of respective pieces of sub-content may be arranged and displayed in generated sequence. Accordingly, the user may check the individual pieces of sub-content and delete part thereof or change the sequence thereof in a temporary stop state. The thumbnail images 140 may be displayed on the data display area while floating in a separate layer.

During recording using the recording interface provided as described above, when the occurrence of a touch input is detected in the data display area at step S15, the content generation device 10 may determine whether the current touch input mode is the page control mode or image addition mode at step S16.

When the current touch input mode is the page control mode, the content generation device 10 may change a displayed image from a page image in the data display area to an image of another page, enlarge, reduce, or move the page image according to the pattern of the touch input at step S17.

For example, when the user moves a page image in order to display a displayed graph at the center while performing pinch-to-zoom operation in order to enlarge the graph displayed in the data display area during a process of recording a moving image while viewing data displayed in the data display area in the recording interface shown in FIG. 7, a page image may be displayed while being changed in response to a touch input of the user. In other words, the user may freely control an image of data in accordance with a description while recording a moving image.

Meanwhile, when it is determined at step S16 that the current touch input mode is the image addition mode, not the page control mode, the content generation device 10 may display a pen image corresponding to the trajectory of a touch input of the user on an data page image at step S18, thereby enabling the user to add a required mark, such as an emphasis mark, an underline, or the like, at a desired location of data image in accordance with a description. In this case, the configuration in which the thickness, color, pattern, or the like of a line corresponding to pen, i.e., the trajectory of a touch input, is selected in a temporary stop state, as shown in FIG. 8, varies depending on an embodiment.

As described above, the narrator of a moving image can freely enter a command in the data display area while switching the touch input mode by using a single mode switching button, and, simultaneously, can focus on the content of a description. In other words, the user can easily perform page control and the appropriate addition of a mark while substantially focusing on the data display area, thereby recording to be completed in one take without a need for the repetition of the performance and stop of recording for each page.

In other words, since a page image displayed in the data display area can be changed, enlarged, or reduced only by a touch input, it is not necessary to stop recording in order to perform control adapted to change, enlarge, or reduce a data image.

Meanwhile, at step S19, the content generation device 10 records changes in page images displayed in the data display area in real time and also records the voices of the narrator input to the microphone while performing the above-described steps S14 to S18. In an embodiment, the content generation device 10 may simultaneously record changes in images in the narrator display area 110 and the data display area 130 in one take in real time, and the overall recording interface may be recorded in one take in real time.

Thereafter, when a command to end recording is input from the user at step S20, a single moving image content package is generated by integrating pieces of data acquired at step S19 up to the input of the command to end recording at step S21. In other words, a single moving image content package may be generated by synchronizing changes in sound acquired during a recording period with an image in which changes in image in the narrator display area and the data display area have been recorded together. It will be apparent that, when a plurality of pieces of sub-content are generated due to a temporary stop, a single moving image content package may be generated by connecting the pieces of sub-content in temporal sequence. In this case, a connected portion may be naturally edited by inserting one or more image effects into the connected portion between the pieces of sub-content. For example, in the connected portion, the pieces of sub-contents may be connected after applying a fade-out effect to a previous piece of sub-content and applying a fade-in effect to a new piece of sub-content.

Furthermore, the content generation device 10 transmits the content generated as described above, together with information about the reception target selected at step S11, to the content delivery server 20. In this case, the content may be tagged with information about the object selected at step S12, and may be then delivered to the content delivery server 20.

Thereafter, the delivered content may be provided to the content reception device 30 corresponding to the reception target and feedback on the content may, in turn, be delivered to the content generation device 10, as described in conjunction with the content delivery system above.

The content generation method according to the embodiment shown in FIG. 6 includes the steps which are processed in a time sequential manner by the content generation device 10 shown in FIGS. 1 to 5. Accordingly, descriptions which are omitted but have been given in connection with the content generation device 10 shown in FIGS. 1 to 5 may be also applied to the content generation method according to the embodiment shown in FIG. 6.

The content generation method according to the embodiment described via FIG. 6 may be also implemented in the form of a storage medium including computer-executable instructions, such as a program module executed by a computer. A computer-readable medium may be any available medium accessible to a computer, and includes all volatile and non-volatile media and separable and non-separable media. Furthermore, the computer-readable medium may include both a computer storage medium and a communication medium. The computer storage medium includes all volatile and non-volatile media and separable and non-separable media implemented using any method or technique for storing information, such as computer-readable instructions, data structures, program modules, and other data. The communication medium typically includes computer-readable instructions, data structures, program modules, other data of a modulated data signal, such as carriers, or other transmission mechanisms, and also includes any information transfer media.

The above description of the present invention is merely for an illustrative purpose. It will be understood that those having ordinary knowledge in the art to which the present invention pertains can easily make modifications and variations without departing from the technical spirit and essential features of the present invention. Therefore, the above-described embodiments are illustrative and not limitative in all aspects. For example, each component described as being in a single form may be practiced in a distributed form. In the same manner, components described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

What is claimed is:

1. A method for generating content, the method being performed by a content generation device including a touch screen, the method comprising:
   receiving a selection of a data file including a plurality of pages from a user;
   when recording is started, providing a recording interface, including a data display area to which images of the respective pages included in the selected data file are individually and sequentially output, to the touch screen;
   when a page change command of the user for the data display area of the recording interface is input, changing and displaying an image displayed in the data display area by changing the displayed image from an image of a page currently displayed in the data display area to an image of another page;
   when the recording is started, recording changes in image in the data display area, made by changing and displaying the image, until the recording is ended;
   when the recording is started, activating a microphone included in the content generation device, and recording changes in received sound until the recording is ended; and
   when the recording is ended, generating moving image content by storing the changes in image and the changes in sound, recorded from a start point of the recording to an end point of the recording, in synchronization with each other,
   wherein the recording interface further comprises a narrator display area configured to, when the recording is started, activate a camera of the content generation device and display changes in image acquired by the camera in real time,
   wherein recording the changes in image comprises simultaneously acquiring changes in image in the data display area and changes in image in the narrator display area and recording these changes in image as a single image, and
   wherein recording the changes in image comprises, when the recording is temporarily stopped, generating a single independent sub-image by recording changes in image acquired up to the temporary stop of the recording;
   recording the changes in sound comprises, when the recording is temporarily stopped, generating a single independent sub-sound by recording changes in sound acquired up to the temporary stop of the recording; and
   generating the moving image content comprises:
      when the recording is temporarily stopped, generating sub-content by combining the sub-image and the sub-sound, generated during the generation of the sub-image and during the generation of the sub-sound, respectively, in synchronization with each other; and
      when the recording is ended, generating a single piece of moving image content by combining two or more pieces of sub-content to each other.

2. The method of claim 1, wherein:
   the recording interface further comprises a control area configured to receive a selection of a recording start command, a temporary stop command, or a recording end command; and
   changing and displaying the image comprises, when a touch input to the data display area is detected, changing and displaying the image displayed in the data display area according to a touch input mode which is selected via the control area or which is selected in response to an input of a preset touch pattern to the data display area.

3. The method of claim 2, wherein the touch input mode comprises:
   a page control mode configured to perform at least one of enlargement, reduction and movement of the image of a currently displayed page and changing of the displayed image to an image of another page in response to a touch input of the user; and
   an image addition mode configured to additionally display a new image, corresponding to a trajectory of a touch input of the user, on the image of a currently displayed page.

4. The method of claim 3, wherein changing and displaying the image comprises:
   when the touch input mode is the page control mode, enlarging, reducing or moving the image of a currently displayed page, or changing the displayed image to an image of another page in response to the touch input of the user; and
   when the touch input mode is the image addition mode, adding and displaying a new image to and on the image of a currently displayed page along the trajectory of the touch input of the user.

5. The method of claim 1, further comprising receiving a selection of a reception target which will receive generated moving image content or receiving information about the reception target.

6. The method of claim 5, further comprising transmitting the information about the reception target and the content generated during the generation of the moving image content to a content delivery server so that the content generated during the generation of the moving image content is delivered to the reception target.

7. The method of claim 4, wherein changing and displaying the image comprises:
   when the touch input mode is the page control mode and the touch input of the user corresponds to a swipe operation in a predetermined direction, changing the displayed page from the image of a currently displayed page to an image of another page, and displaying the image of another page; and
   when the touch input mode is the page control mode and the touch input of the user corresponds to a pinch-to-zoom operation, enlarging or reducing the image of a currently displayed page, and displaying the enlarged or reduced image of a currently displayed image.

8. The method of claim 2, wherein the control area:
   when the recording is started, is formed as a separate area distinctive from the data display area; and
   when the recording is temporarily stopped, is extended while encroaching on at least part of the data display area, and is displayed in a separate layer.

9. The method of claim 1, comprising, when the recording is temporarily stopped or ended, enumerating and displaying pieces of sub-content generated up to the temporary stop or end of the recording, and changing a sequence of connection of the displayed pieces of sub-content, deleting at least part of the displayed pieces of sub-content, or replacing a selected piece of sub-content with another piece of sub-content.

10. A device for generating content, the device including a touch screen, the device comprising:
    a data registration unit configured to receive a selection of a data file including a plurality of pages from a user;
    an interface provision unit configured to, when recording is started, providing a recording interface, including a data display area to which images of the respective pages included in the selected data file are individually and sequentially output, via the touch screen, and also configured to, when a page change command of the user for the data display area of the recording interface is input, changing and displaying an image displayed in the data display area by changing the displayed image from an image of a page currently displayed in the data display area to an image of another page;
    an image acquisition unit configured to, when the recording is started, record changes in image in the data display area until the recording is ended;
    a sound acquisition unit configured to, when the recording is started, activate a microphone included in the content generation device and record changes in received sound until the recording is ended; and
    a content generation unit configured to, when the recording is ended, generate moving image content by storing the changes in image and the changes in sound, recorded from a start point of the recording to an end point of the recording, in synchronization with each other,
    wherein the image acquisition unit configured to, when the recording is temporarily stopped, generating a single independent sub-image by recording changes in image acquired up to the temporary stop of the recording,
    wherein the sound acquisition unit configured to, when the recording is temporarily stopped, generating a single independent sub-sound by recording changes in sound acquired up to the temporary stop of the recording,
    wherein content generation unit configured to, when the recording is temporarily stopped, generating sub-content by combining the sub-image and the sub-sound, generated during the generation of the sub-image and during the generation of the sub-sound, respectively, in synchronization with each other; and when the recording is ended, generating a single piece of moving image content by combining two or more pieces of sub-content to each other.

11. The device of claim 10, wherein:
    the recording interface further comprises a control area configured to receive a selection of a recording start command, a temporary stop command, or a recording end command; and
    the interface provision unit, when a touch input to the data display area is detected, changes and displays the image displayed in the data display area according to a touch input mode which is selected via the control area or which is selected in response to an input of a preset touch pattern to the data display area.

12. The device of claim 11, wherein the touch input mode comprises:
    a page control mode configured to perform at least one of enlargement, reduction and movement of the image of a currently displayed page and changing of the displayed image to an image of another page in response to a touch input of the user; and
    an image addition mode configured to additionally display a new image, corresponding to a trajectory of a touch input of the user, on the image of a currently displayed page.

13. The device of claim 12, wherein the interface provision unit:
- when the touch input mode is the page control mode, enlarges, reduces or moves the image of a currently displayed page, or changes the displayed image to an image of another page in response to the touch input of the user; and
- when the touch input mode is the image addition mode, adds and displays a new image to and on the image of a currently displayed page along the trajectory of the touch input of the user.

14. The device of claim 10, wherein:
- the recording interface further comprises a narrator display area configured to display changes in image, acquired by a camera provided in the device for generating content, in real time; and
- the image acquisition unit, when the recording is started, acquires a single image by simultaneously recording changes displayed in image in the data display area and changes in image displayed in the narrator display area together.

15. The device of claim 10, further comprising a content transmission unit configured to transmit information about a reception target intended to receive the content generated by the content generation unit and received from the user, and the content generated by the content generation unit to a content delivery server.

16. The device of claim 15, further comprising a transmission detail checking unit configured to, for each of one or more pieces of content generated by the content generation unit and delivered to the content delivery server via the content transmission unit, receive content transmission details, including information about whether a reception target of each piece of content has received the content or not and feedback data delivered from the reception target to the content delivery server, from the content delivery server and provide the content transmission details to the user.

17. The device of claim 12, wherein the content generation device, in the image addition mode, adds a new image, corresponding to the trajectory of the touch input of the user, in a color distinctive from a color of at least part of the page currently displayed in the data display area based on the color of the at least part of the page currently displayed in the data display area.

* * * * *